(12) United States Patent
Manzella et al.

(10) Patent No.: US 8,705,531 B2
(45) Date of Patent: Apr. 22, 2014

(54) MULTICAST ADDRESS LEARNING IN AN INPUT/OUTPUT ADAPTER OF A NETWORK PROCESSOR

(75) Inventors: Joseph A. Manzella, Macungie, PA (US); Nilesh S. Vora, Fogelsville, PA (US); Ritchie J. Peachey, Whitehall, PA (US)

(73) Assignee: LSI Corporation, Milpitas, CA (US)

( * ) Notice: Subject to any disclaimer, the term of this patent is extended or adjusted under 35 U.S.C. 154(b) by 74 days.

(21) Appl. No.: 13/480,623

(22) Filed: May 25, 2012

(65) Prior Publication Data

US 2012/0236857 A1   Sep. 20, 2012

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/580,170, filed on Dec. 23, 2011.

(51) Int. Cl.
*G21C 3/00* (2006.01)

(52) U.S. Cl.
USPC ......................................................... 370/390

(58) Field of Classification Search
USPC ................. 370/252, 389, 390, 378, 381, 392, 370/395.7, 429, 463
See application file for complete search history.

(56) References Cited

U.S. PATENT DOCUMENTS

| | | | |
|---|---|---|---|
| 4,622,631 A | 11/1986 | Frank et al. | |
| 5,623,698 A | 4/1997 | Stephenson et al. | |
| 5,689,506 A * | 11/1997 | Chiussi et al. | ................ 370/388 |
| 5,892,766 A | 4/1999 | Wicki et al. | |
| 5,943,283 A | 8/1999 | Wong et al. | |
| 6,026,467 A | 2/2000 | Petty | |
| 6,038,630 A | 3/2000 | Foster et al. | |
| 6,195,335 B1 | 2/2001 | Calvignac et al. | |
| 6,216,167 B1 | 4/2001 | Momirov | |
| 6,289,013 B1 | 9/2001 | Lakshman et al. | |
| 6,341,130 B1 | 1/2002 | Lakshman et al. | |
| 6,567,564 B1 | 5/2003 | van der Wal | |
| 6,584,546 B2 | 6/2003 | Kavipurapu | |
| 6,636,932 B1 | 10/2003 | Regev et al. | |
| 7,089,346 B2 | 8/2006 | Cebulla et al. | |
| 7,234,018 B1 | 6/2007 | Purcell et al. | |
| 7,397,809 B2 | 7/2008 | Wang | |
| 7,461,208 B1 | 12/2008 | Caprioli et al. | |

(Continued)

*Primary Examiner* — Anh Ngoc Nguyen (57) ABSTRACT

An apparatus for supporting multicast address learning in a network processor includes a task parameter decoder receiving the packet and determining parameters of the packet, a plurality of unlearned address counters recording a number of the packets to be multicast, a correlator determining destination addresses of the packet, a multicast replicator replicating the packet multiple times, and a task generator generating a generated packet with a bitmap and sending out the generated packet to an I/O adaptor over a task ring interface of the network processor. If the packet is unlearned, the unlearned address counter is then incremented and the unlearned packet is sent back to a special queue in the I/O adaptor over the task ring interface with an index to the bitmap for replicating by the multicast replicator, after replicating, the unlearned address counter is decremented. Methods for replicating unlearned/learned multicast packets within a network processor are included.

32 Claims, 6 Drawing Sheets

(56) References Cited

U.S. PATENT DOCUMENTS

| | | |
|---|---|---|
| 7,519,065 B2 | 4/2009 | Angle et al. |
| 7,554,928 B2 * | 6/2009 | Bhargava et al. ............. 370/252 |
| 7,596,142 B1 | 9/2009 | MacAdam |
| 7,710,988 B1 | 5/2010 | Tripathi et al. |
| 7,720,055 B2 | 5/2010 | Kadambi et al. |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0165111 A1 * | 7/2006 | Varma ........................... 370/428 |
| 2006/0256783 A1 | 11/2006 | Ayrapetian et al. |
| 2007/0016756 A1 | 1/2007 | Hsieh et al. |
| 2007/0226798 A1 | 9/2007 | Sibert |
| 2008/0092092 A1 | 4/2008 | Dalton et al. |
| 2008/0162793 A1 | 7/2008 | Chu et al. |
| 2009/0271562 A1 | 10/2009 | Sinclair |
| 2010/0260198 A1 | 10/2010 | Rojas-Cessa et al. |
| 2010/0316062 A1 | 12/2010 | Manzella |

* cited by examiner

MULTICAST ADDRESS LEARNING IN AN INPUT/OUTPUT ADAPTER OF A NETWORK PROCESSOR

CROSS-REFERENCE TO RELATED APPLICATIONS

This application claims the benefit of the filing date of U.S. provisional application No. 61/580,170, filed Dec. 23, 2011, the teachings of which are incorporated herein in their entireties by reference.

This application is a continuation-in-part, and claims the benefit of the filing date, of U.S. patent application Ser No. 12/782,379 filed May 18, 2010, Ser. No. 12/782,393 filed May 18, 2010 now U.S. Pat. No. 8,255,644, and Ser. No. 12/782,411 filed May 18, 2010 now U.S. Pat. No. 8,407,707, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,726 filed Mar. 12, 2011, Ser. No. 13/046,717 filed Mar. 12, 2011, Ser. No. 13/046,719 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, and Ser. No. 13/474,114 filed May 17, 2012, the teachings of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators. Network processors implemented as a system on chip (SoC) having multiple processing modules might typically classify an incoming packet to determine which of the processing modules will perform operations for the particular packet or flow of packets.

A network processor in a switching network might provide transport of received data packets from an input port to one (unicast) or more (multicast) output ports of the network. Received data packets are provided to one or more output ports according to a scheduling algorithm. Some network switches provide multicasting by replicating received packets at the output port(s) corresponding to the received packet. Multicast packets might be replicated as many times as the number of output ports to which the multicast packet is to be broadcast. Thus, in some network switches, large amounts of packet data are replicated to enable multicasting.

SUMMARY OF THE INVENTION

One embodiment provides an apparatus comprising a task parameter decoder receiving the packet from a task ring interface of the network processor through a task start interface and determining at least one parameter of the packet including determining whether the packet corresponds to a multicast packet or a unicast packet, a plurality of unlearned address counters recording a number of the packets that is in a flow to be multicast and determining whether the packet is being sent out, a correlator determining destination addresses of the packet based on an output of a parsing and bridging logic for each packet to be generated and transmitted by the network processor, a multicast replicator receiving the destination addresses determined by the correlator and replicating the packet multiple times based on a number of the destination addresses corresponding to the packet, and a task generator generating a generated packet with a bitmap and sending out the generated packet to the I/O adaptor over the task ring interface, wherein the bitmap is analyzed in the I/O adaptor and multiple packets are created for transmitting to at least one processing module of the network processor for further processing based on the destination addresses determined by the correlator, wherein, if the task parameter decoder determines the packet is an unlearned packet, the unlearned address counter is incremented and the unlearned packet is sent back to a dedicated queue in the task start interface of the I/O adaptor over the task ring interface with the bitmap for replicating by the multicast replicator, which results in a great reduction in bandwidth since a multicast replication uses pointers for a majority of data and only replicates header data of the packet, after replicating, the unlearned address counter is decremented.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION

Hereinafter, embodiments of the present invention are described with reference to the drawings. Described embodiments relate to a device and method for multicast packets transmitted in a switching system employing a network processor based on a ring interface. When a multicast packet is sent to multiple sources, a large amount of system bandwidth might be used if the packet has to be replicated. In some systems, for example in an Ethernet system, when a packet destination is not known or is unlearned, the packet might be multicast to all potential destinations. Thus, once the destination address is learned or is known, the packet might be sent only to the specific known destination. In order to avoid misordering of packets, a packet having a learned address beneficially follows the same processing path in the network processor as a packet in which the address was unknown when looked up in an address table. There might be several ways to do so. One approach might have a bitmask stored with the packet and have a packet dequeue logic track where the packet is going to be sent. This solution might not be viable in some systems, for example, systems that do not have capability for storing the bitmap in memory and dequeuing multiple times based on the bitmap. A second solution might replicate the packet and send it multiple times on enqueue logic. This might work in the systems that have no capability for sending the bitmap, but might cause major bandwidth implications.

Described embodiments provide logic that supports multicast address learning in an I/O adapter in systems that do not have capability for sending the bitmap, without also requiring large bandwidth. Described embodiments employ a decision from a parsing/bridging logic for a task containing multicast or unlearned packets for a flow. This decision is employed to determine how to route the task, ensuring ordering and proper multicast behavior with minimal bandwidth impact. Here, the flow might be viewed as having a unique address, such as a unique media access control (MAC) source address and MAC destination (Src/Dest) address.

Note that herein, a network processor and a switch system might be used interchangeably. It is understood that a network processor or switch system might employ a task ring interface/memory subsystem that are employed by described embodiments. It is also understood that the network processor or the switch system in the described embodiments might include any existing and/or emerging network processors and/or switch systems.

Note that herein, the term "task" and the term "packet" might also be used interchangeably. It is understood that one or more tasks might correspond to, or contain data of, a packet, and that the packet might refer to a data packet or a network packet. The packet might include a header and a body containing the message data. It is also understood that depending on the type of network, the packet might be referred to by another name, such as, frame, block, cell, segment, etc.

The following detailed description utilizes a number of acronyms, which are generally well known in the art. While definitions are typically provided with the first instance of each acronym, for convenience, Table 1 provides a list of the acronyms, abbreviations and terms used along with their respective definitions.

TABLE 1

| | | | |
|---|---|---|---|
| ACL | Access Control List | BL | Bridging Layer |
| CRC | Cyclic Redundancy Check | DDR | Double Data Rate |
| DRAM | Dynamic Random Access Memory | EIOA | Ethernet Input/Output Adapter |
| FIFO | First-In, First-Out | I/O | Input/Output |
| IP | Internet Protocol | MAC | Media Access Control |
| MCHash | Multicast Hash value | MMB | Memory Manager Block |
| MPLS | Multi-Protocol Label Switching | MPP | Modular Packet Processor |
| MTM | Modular Traffic Manager | OSI | Open Systems Interconnection |
| PAB | Packet Assembly Block | PCI-E | Peripheral Component Interconnect Express |
| RxPort | Receive Port | SAS | Serial Attached SCSI |
| SATA | Serial Advanced Technology Attachment | SCSI | Small Computer System Interface |
| SED | Stream Editor | SoC | System-on-Chip |
| SPP | Security Protocol Processor | Src/Dest | Source and Destination |
| SRIO | Serial Rapid I/O | TCP | Transmission Control Protocol |
| UDP | User Datagram Protocol | USB | Universal Serial Bus |
| VLAN | Virtual Local Area Network | Vflow | Virtual Flow |
| multicast packet | packet sent to multiple destination addresses | unicast packet | packet sent to a single destination address |
| learned destination | A destination address that is known by the bridging logic | unlearned destination | A destination address that is not currently known by the bridging logic |
| μP | Microprocessor | OSSP | Organization-Specific Slow Protocol |

Figure 1:
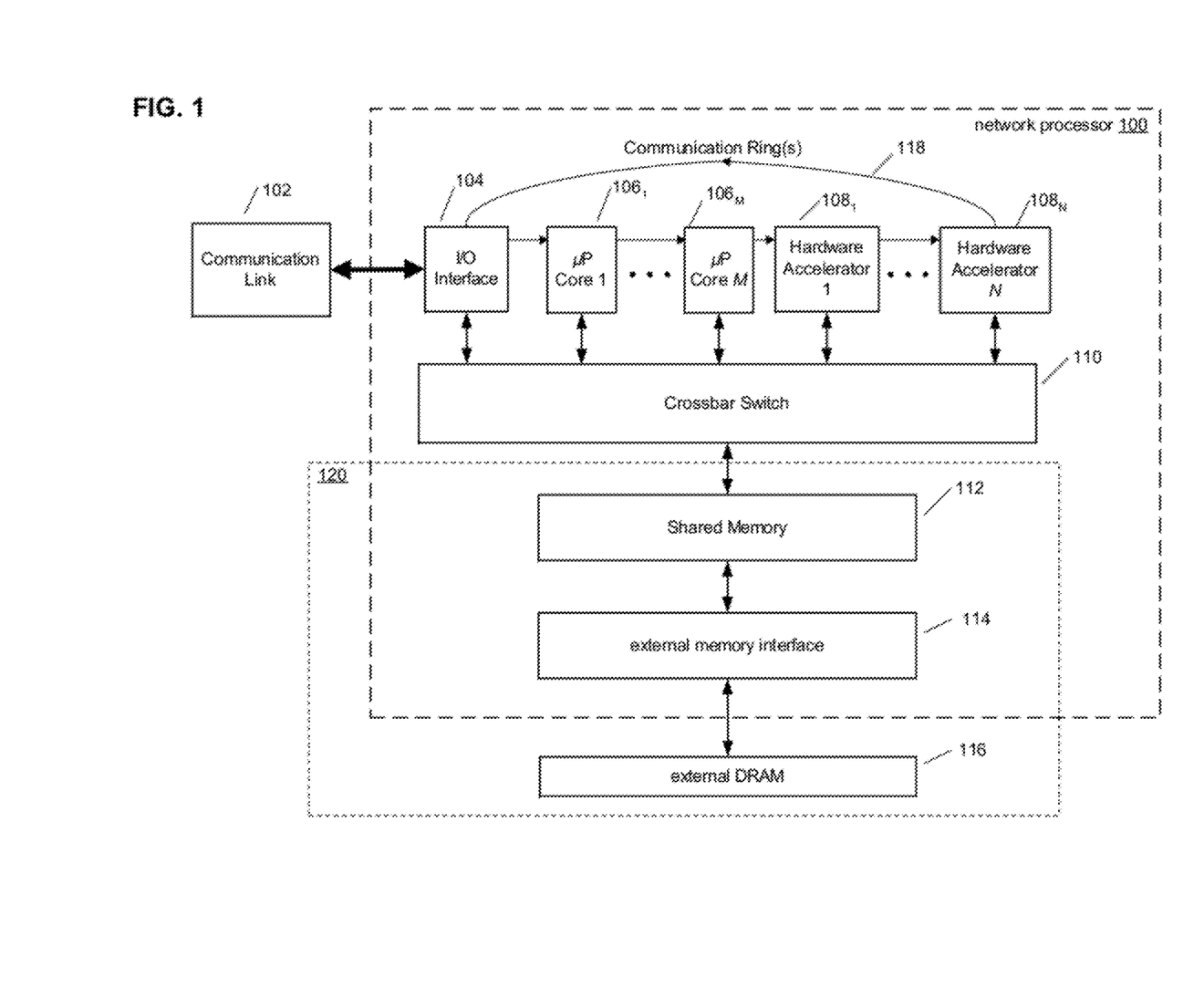
FIG. 1 shows a block diagram of a network processor operating a multicast address learning in an input/output (I/O) adaptor in accordance with exemplary embodiments of the present invention.

Referring to FIG. 1, a block diagram of an exemplary network processor system (network processor 100) implemented as a system-on-chip (SoC) is shown in accordance with exemplary embodiments.

Network processor 100 might be used for processing data packets, performing protocol conversion, encrypting and decrypting data packets, or the like. As shown, network processor 100 includes crossbar switch 110, on-chip shared memory 112, external memory interface 114 and task ring interface 118. Task ring interface 118 includes one or more input/output (I/O) interfaces (or adapters) collectively shown as I/O interface 104, one or more microprocessor (µP) cores $106_1$-$106_M$, and one or more hardware accelerators $108_1$-$108_N$, where M and N are integers greater than or equal to 1. As indicated by the dashed line, shared memory 112 and external memory 116 might generally be referred to as system memory 120. In some embodiments, such as shown in FIG. 1, each of the one or more I/O interfaces 104, µP cores $106_1$-$106_M$ and hardware accelerators $108_1$-$108_N$ might be coupled through crossbar switch 110 to shared memory 112.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via crossbar switch 110, to a buffer in shared memory 112.

I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. I/O interface 104 might typically be implemented as hardware (or logic) that connects network processor 100 to one or more external devices through I/O communication link 102. Received data packets are preferably placed in a buffer in shared memory 112 by transfer between I/O interface 104 and shared memory 112 through switch 110.

I/O interface 104 provides various types of I/O interface functions and, in exemplary embodiments described herein, is a command-driven hardware adaptor that connects network processor 100 to external devices. Received data packets are preferably placed in shared memory 112 and then one or more corresponding tasks are generated. Transmitted data packets are preferably generated from data in shared memory 112 for one or more corresponding tasks and might be transmitted out of network processor 100. Exemplary I/O interfaces 104 include Ethernet I/O adapters (EIOA) providing integrity checks of incoming data. The I/O adapters might also provide timestamp data for received and transmitted packets that might be used to implement features such as timing over packet, e.g., specified in the standard recommendations of IEEE 1588. In alternative embodiments, I/O interface 104 might be implemented as input (receive) only or output (transmit) only interfaces.

Crossbar switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

Shared memory 112 is a conventional memory operating as a cache that might be allocated and/or subdivided. For example, shared memory 112 might include one or more FIFO queues that might be dynamically allocated to the various µP cores 106 and hardware accelerators 108.

External memory interface 114 might communicate with external memory 116. External memory interface 114 couples shared memory 112 to one or more external memories, shown as external memory 116, to provide off-chip storage of data not currently in use by the various µP cores 106 and hardware accelerators 108 to free space in shared memory 112.

External memory 116 might typically be implemented as a dynamic random-access memory (DRAM), such as a double-data-rate three (DDR-3) DRAM, for off-chip storage of data.

Various µP cores 106 and hardware accelerators 108 of network processor 100 might include several exemplary types of processors or accelerators. For example, various µP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM).

Various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250, 898 filed Sep. 30, 2011, which are incorporated by reference herein.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The RegEx engine is a packet search engine for state-based cross-packet pattern matching. The RegEx engine is multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

Hardware accelerators 108 might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782, 393, and 12/782,411 all filed May 18, 2010, which are incorporated by reference herein.

Figure 2:
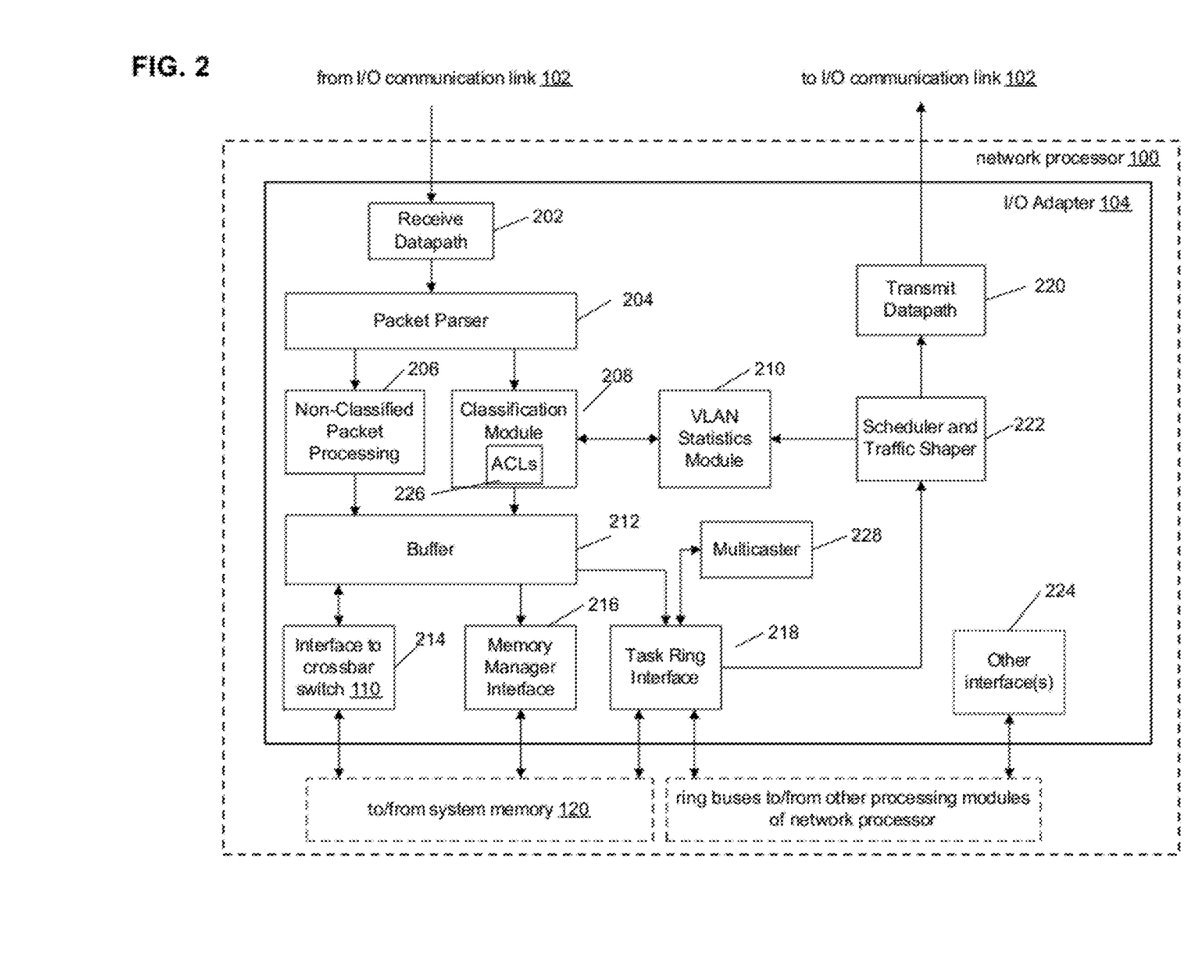
FIG. 2 shows a block diagram of an input/output interface of the network processor of FIG. 1, in accordance with exemplary embodiments of the present invention.

FIG. 2 shows a block diagram of I/O interface 104 of the network processor shown in FIG. 1 in accordance with exemplary embodiments. As described above, I/O communications link 102 might be at least one of a SCSI protocol bus, a SAS protocol bus, a SATA protocol bus, a USB bus, an Ethernet link, an IEEE 802.11 link, an IEEE 802.15 link, an IEEE 802.16 link, a PCI-E link, an SRIO, or other similar interfaces. In some embodiments, I/O communications link 102 might also include one or more debug interfaces for interfacing with, for example, development tools of users of network processor 100, such as a debugger operating in compliance with a Joint Test Action Group (JTAG) interface, a Serial Wire Debug (SWD) interface, or miscellaneous interfaces such as Serial Peripheral Interface (SPI), a Serial Line Internet Protocol (SLIP) interface or a Universal Asynchronous Receiver/Transmitter (UART) such as described in related U.S. patent application Ser. No. 13/274,726 filed Oct. 17, 2011.

As shown in FIG. 2, I/O interface 104 might have interface with I/O communications link 102 via receive datapath 202 and transmit datapath 220.

Receive datapath 202 provides data received from I/O communications link 102 to packet parser 204. Packet parser 204 extracts various data fields from received packets. For example, packet parser 204 might extract OSI Layer 2, Layer 3 or Layer 4 fields from the received packet, such as MAC addresses, MPLS addresses, IP addresses, or TCP/UDP port addresses. Packet parser 204 might also perform some verification of the received packet, such as verifying a CRC value or IPv4 checksum, or verifying that the packet is properly formed. Depending on the extracted data, packet parser 204 might also perform special processing for a received packet. For example, packet parser 204 might detect Ethernet synchronization messaging channel (ESMC) packets or Organization-Specific Slow Protocol (OSSP) packets (e.g., in accordance with IEEE 802.3) and provide them to a specialized data flow of network processor 100.

Some specialized packets might be provided to non-classified packet processing module 206, which might generate and enqueue a task for processing within network processor 100 without further processing by I/O interface 104. For example, Ethernet "pause" packets, Ethernet "runt" packets, OSSP packets and ESMC packets might be provided to module 206.

Typical received packets might be provided to classification module 208. Classification module 208 might include one or more access control lists (ACLs) 226 and might perform bridging, policing, and correlation for received packets. For example, classification module 208 might be employed to determine, via ACLs 226 or one or more bridging lists (not shown), one or more destinations corresponding to a received packet. For example, some embodiments of the present invention might support MAC address bridging in accordance with IEEE 802.1D. Each ACL 226 might include one or more rules based on at least one of a virtual local area network (VLAN) corresponding to the packet and a port corresponding to the packet. Classification module 208 might also check rate limits for corresponding VLANs and ports.

After processing by either module 206 or classification module 208, received packet data might be stored in buffer 212 before being written, via interface 214, to system memory 120. One or more memory blocks in system memory 120 might be allocated to store the received packet data based on a request sent to the MMB via memory manager interface 216. The one or more tasks generated corresponding to the received packet is provided to subsequent processing modules of network processor 100 via task ring interface 218. As shown in FIG. 2, I/O interface 104 might also have one or more additional communications interfaces, e.g., a clock signal, etc., with various modules of network processor 100, shown as other interfaces 224.

I/O interface 104 receives tasks for transmission onto I/O communication link 102 via task ring interface 218. Task ring interface 218 provides an address in system memory 120 of data to be transmitted to scheduler and traffic shaper 222. Scheduler and traffic shaper 222 schedules packets for transmission by I/O interface 104 onto communication link 102. Scheduler and traffic shaper 222 might shape packet traffic based on per-port credits, where the credits are based on packet size. A data packet for transmission is provided to transmit datapath 220, which transmits the data packet to a destination via I/O communication link 102.

VLAN statistics module 210 might maintain one or more statistics for various VLANs of network processor 100. Such statistics might include a number of packets transmitted, a number of bytes transmitted, a number of packets received and a number of bytes received for each VLAN of network processor 100. VLAN statistics module 210 receives inputs from classification module 208, e.g., corresponding to packets received by network processor 100, and scheduler and shaper 222, e.g., corresponding to packets transmitted by network processor 100, to track one or more statistics of each transmitted and received packet. VLAN statistics module 210 might operate substantially as described in related U.S. patent application Ser. No. 13/310,961 filed Dec. 5, 2011.

Multicaster module 228 receives multicast data packets received by I/O adapter 104 and generates one or more tasks within network processor 100 corresponding to the multicast packet. The one or more tasks are provided to one or more processing modules of network processor 100 via task ring interface 218.

Figure 3:
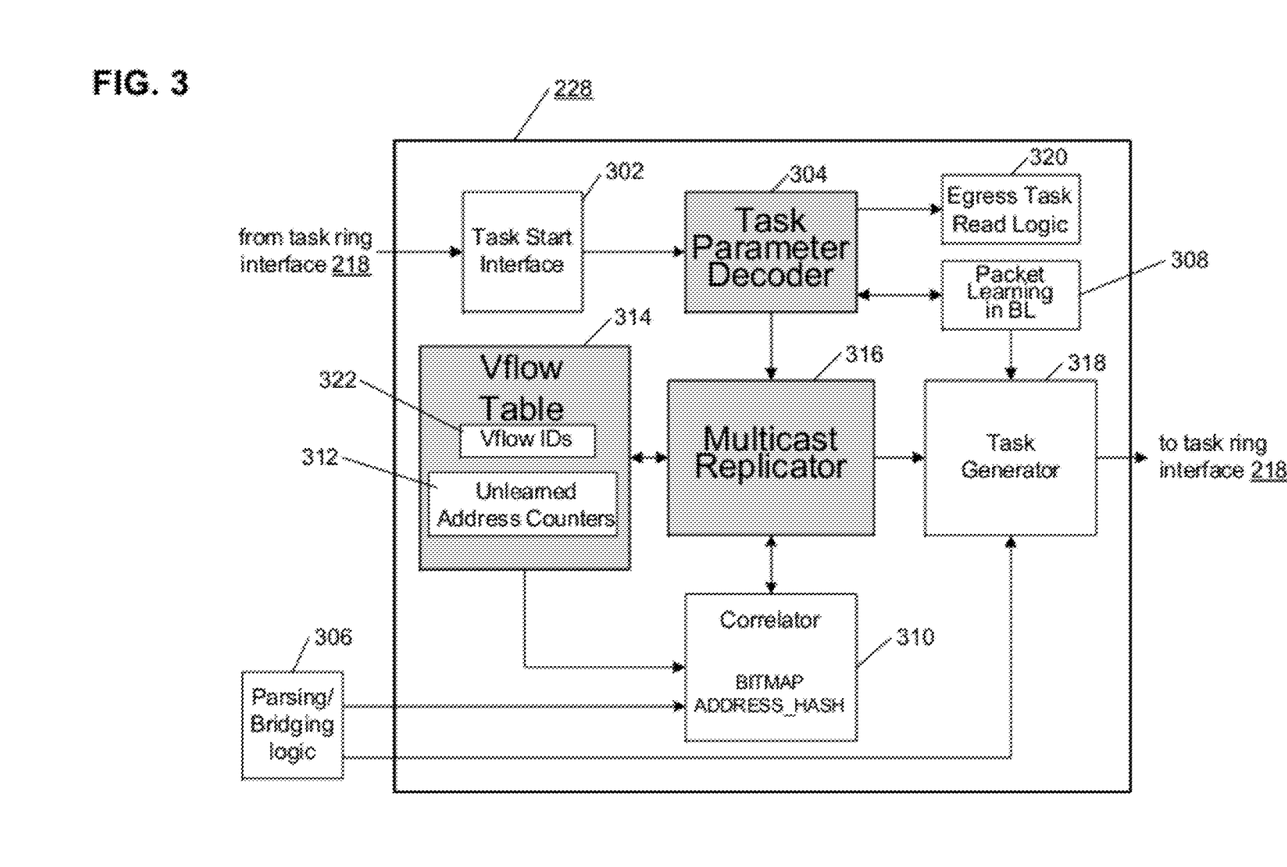
FIG. 3 shows a block diagram of a multicaster module of the input/output interface of FIG. 2, in accordance with exemplary embodiments of the present invention.

FIG. 3 shows details of multicaster module 228 in I/O interface 104 of FIG. 2 in accordance with exemplary embodiments. As described above, network processor 100, I/O interface 104 might support multicast packets, which means that the network processor sends a packet to multiple destinations. In addition, the packets for a given flow desirably maintain ordering. It is important that the packets do not get misordered, especially when the addresses corresponding to the packets are transitioning from an unlearned state to a learned state. As shown in FIG. 3, multicaster module 228 supports multicast address learning in an I/O adaptor. It is understood that multicaster module 228 might be employed to support multicast packets in one or more other of hardware accelerators 108 in network processor 100.

In a system such as shown in FIG. 1, tasks, i.e., packets, might be sent to multiple sources for several reasons, such as, multicast/broadcast MAC addresses, mirroring of packets to a second port, sending packets to multiple destinations if a destination address is unlearned. All of these might be referred to as "multicast". When a task or a packet is required to be multicast, the task might take two "trips" through the I/O adaptor (e.g., I/O interface 104 of network processor 100) on task ring 118. The first trip results in the task sent to I/O interface 104 over task ring interface 118. The task might also include a bitmap in one or more task parameter fields that indicate the task corresponds to a multicast packet. Alternatively, the task might include a pointer or index to a memory address storing the bitmap (e.g., in memory 120). The multicast packet data might not be replicated on the first trip to I/O interface 104, for example, in the case of an initial task enqueue operation. When the task is received back in I/O interface 104, the bitmap is analyzed in I/O interface 104, and used to generate a header of the packet to be replicated. A multicast count might be incremented before multicast replication and decremented after multicast replication, and multiple tasks are created. These two trips might be desirable due to design considerations of network processor 100, for example if network processor 100 did not provide a way to create a multicast launch task.

As shown in FIG. 3, multicaster module 228 includes task start interface 302, task parameter decoder 304, correlator 310, unlearned address counters 312, multicast replicator 316, and task generator 318. Task start interface 302 and task parameter decoder 304 are logics which receive tasks from task ring interface 218 of network processor 100 as shown in FIG. 1. Correlator 310 contains logic to determine where to send the packet. Unlearned address counters 312 includes a bank of counters which keep track of how many packets are in flight to be multicast, wherein the counters might be organized as a per-source port fashion and the number is based on a hash. Multicast replicator 316 contains logic to replicate the task multiple times. Task generator logic 318 contains logic to send the tasks onto task ring interface 218 of network processor 100. Multicaster module 228 also includes Vflow table 314 associated with Vflow IDs 322 and packet learning module 308 in a bridging layer (BL) and egress task read logic 320. Parsing and bridging logic 306 for initially receiving the tasks might be included in multicast module 228 or placed outside multicast module 228. Each element included in multicaster module 228 will be described below in detail.

Task start interface 302 might receive tasks from task ring interface 218 and provide the tasks to task parameter decoder 304, where the tasks correspond to data packets received by I/O interface 104.

Task parameter decoder 304 receives tasks from task ring interface 218 through task start interface 302. Task parameter decoder 304 might determine one or more parameters of the packet. For example, task parameter decoder 304 might determine a virtual flow (Vflow) identification (ID) value corresponding to the packet, a source address of the packet, one or more destination addresses of the packet, whether each task corresponds to a unicast packet or a multicast packet, a size of the packet, and other parameters. When a packet is received by multicaster 228, task parameter decoder 304 determines whether the packet corresponds to a multicast or unicast packet, for example by checking an indicator corresponding to the packet. Task parameter decoder 304 also determines whether to decrement the corresponding counter for the packet. Alternatively, the hash might be performed outside multicast module 228 and provided to multicast module 228. Task parameter decoder 304 provides the task parameters associated with the packet to multicast replicator 316 for multicast packets, to packet learning module 308 for learning packets and to egress task read logic 320 for egress packets.

Task start interface 302 might contain a dedicated queue for multicast replication. When the packet comes onto this queue, the following procedure might be followed. First, the first 8 bytes of parameters are read, and the bitmap, address hash, and unlearned packet flag are extracted. Next, the packet, or a portion of the packet (e.g., the header portion) is sent out to each location in the bitmap. The blocks of memory pointed to by pointers in the packet header have an unlearned address counter incremented which indicates the number of packets in flight corresponding to the hash value. Further, once the packet has been sent to all locations, an unlearned address counter associated with the packet is decremented.

Parsing and bridging logic 306 might make a decision to determine a destination of the task when the packet is received by I/O interface 104. The result of this decision might include an unlearned address indication, an index referencing internal table and an address hash, which might be extracted in the dedicated queue contained in task start interface 302. The unlearned address indication might be a flag indicating whether a destination address is known or not (learned or not) which exists in a bridging table (not shown). The bitmap might include a 24 bit vector indicating the destination(s) task is sent to. Each bit responds to one destination, if multiple bits are set, the packet is a multicast packet, and if one bits is set, the packet is a unicast packet. The address hash might be an 8 bit hash of the source/destination addresses of the packet.

Packet learning module 308 tracks the number of packets being processed by network processor 100. Packet learning module 308 might also maintain other data about unicast and multicast packets, such as one or more packet destination addresses, such as MAC addresses. For example, in some embodiments, packet learning module 308 might track MAC addresses of packets received by network processor 100.

If the hashed address corresponds to one or more unlearned destination addresses for a multicast packet, e.g., the hashed value of the destination address is not already stored in packet learning module 308, then an entry in an address table of packet learning module 306 is created corresponding to the hashed value, and a counter associated with each hashed destination address value is incremented. The entry, and thus the associated counter, might be selected based on a physical input port corresponding to the packet and the hashed value one or both of the source address of the packet and the destination address(es) of the packet.

Correlator 310 operates on the output of parsing and bridging logic 306. Correlator 310 implements the following algorithm. In the case of one bit set in the bitmap, unlearned address counters 312 might be read. If a counter in unlearned address counters 312 is zero, the packet is sent to the destination set in the bitmap over task ring interface 218. If the counter in unlearned address counters 312 is non-zero, the packet might be flagged as a multicast unlearned packet, although the packet is a unicast packet, and unlearned address counters 312 associated with the address hash might be incremented. In the case of more than one bit set in the bitmap, the unlearned address indication is set, the packet might be flagged as a multicast unlearned packet, and unlearned address counters 312 associated with the address hash might be incremented. If the unlearned address indication is not set, the packet might be flagged as a multicast learned packet.

When the packet is flagged as multicast learned or multicast unlearned, then the packet might be sent on task ring interface 218 back to I/O interface 104 on the dedicated queue. The parameters might be set in the packet to indicate that the packet is a multicast packet, and whether or not the packet is an unlearned packet. The packet might have the first 8 bytes set with multicast information, more specifically, the bitmap location, the address hash, and whether or not the packet is an unlearned packet, either a multicast unlearned or match to unlearned address counter 312.

Furthermore, correlator 310 might enqueue packet data in conjunction with common IP used in all engines of I/O interface 104. The packet data gets written to a task, some data might be inline with the task header, and the rest, the not-inline task data, might be put in the blocks of memory which are pointed to by the pointers in the task header, as described above. Correlator 310 might enqueue packet data to have the task header to be replicated as described below.

Unlearned address counters 312 might be responsible for keeping track of unlearned addresses that have not yet been replicated. Whenever the packet comes in, a hash of the source/destination address is calculated by task parameter decoder 304. If the address destination is an unlearned unicast destination, then a counter of unlearned address counters 312 associated with the hash value is incremented, in which the counter is selected by a combination of the physical input port and the hash of the source/destination address. The packet is then forwarded to a Vflow ID (e.g., one of 322) in Vflow table 314 associated with multicast replication, which might be the same I/O interface engine, herein, I/O interface 114, that was sourced the data of the packet. A unlearned hash decrement field, which might refer to the requirements of I/O interface 114 for more information on parameter field meanings and locations, is set in the packet parameter to indicate that the packet is an unlearned packet that is being replicated, with a control field (e.g., MCHash) containing an unlearned hash value of the packet, and another control field (e.g., RxPort) containing the physical source port of the packet.

Similarly, if a learned destination comes in and the corresponding counter in unlearned address counters 312 that matches the hash has a non-zero value, then this might indicate that the corresponding replication pipe is not empty, and the destination must be sent down the multicast replicator path to avoid packet misordering. In this case, unlearned address counters 312 might also be incremented and the packet might be sent to the hash destination. The unlearned hash decrement field might set in the packet parameter to indicate that the packet is an unlearned task that is being replicated, with MCHash containing the unlearned hash value of the packet, and RxPort containing the physical source port of the packet. Herein, mirrored or multicast packets might not cause increments of the counter in unlearned address counters 312. The unlearned hash decrement field in the task parameter might be cleared to indicate that the corresponding counter in unlearned address counters 312 should not be decremented. When the packets come in with parameters that indicate the packets are destined for the multicast replicator, if a decrement unlearned hash is set, then after the packet is fully sent, the counter selected by a combination of RxPort and MCHash is decremented.

Furthermore, the counter of unlearned address counters 312 associated with the hash value might have several thresholds, which when the threshold is exceeded, the counter might cause the packet to be dropped to keep the multicast bandwidth to a minimum Table 2 lists multicast replicator drop thresholds.

TABLE 2

| Multicast Replicator Drop Thresholds | |
| --- | --- |
| Threshold Name | Use |
| UnlearnedReplicateThreshold | When exceeded, unlearned packets will be dropped by the replication logic instead of being replicated. The unlearned hash counter is decremented in this case. |

TABLE 2-continued

Multicast Replicator Drop Thresholds

| Threshold Name | Use |
| --- | --- |
| UnlearnedForwardThreshold | When exceeded, unlearned packets will be dropped before being forwarded onto the task ring interface for the EIOA. The unlearned hash counter is not incremented in this case. |
| UnlearnedHashMatchReplicateThreshold | When exceeded, unicast packets that have a hash match will be dropped by the multicast replication logic instead of being sent. The unlearned hash counter is decremented in this case. |
| UnlearnedHashMatchForwardThreshold | When exceeded, unicast packets that have a hash match will be dropped before being forwarded onto the task ring interface for the EIOA. The unlearned hash counter is not incremented in this case. |
| MulticastReplicateThreshold | When exceeded, multicast packets will be dropped by the replication logic instead of being replicated. |
| MulticastForwardThreshold | When exceeded, multicast packets will be dropped before being forwarded onto the task ring interface for the EIOA |
| MaxUnlearnedForwardThreshold | When exceeded, unlearned packets will be dropped by the replication logic instead of being replicated. The unlearned hash counter is not incremented. |
| UnlearnedHashCounterDrainValue | When a packet has an unlearned hash counter value that exceed this value, the packet will be dropped before being forwarded onto the task ring for the EIOA and also not be replicated until all packets are drained (the corresponding counter goes to 0). |

Multicast replicator 316 might replicate the packet multiple times based on the number of multicast destinations corresponding to the packet. Correlator 310 might provide the destination addresses of the packet to multicast replicator 316. Multicast replicator 316 might determine one or more Vflows corresponding to the multicast packet. A Vflow corresponds to a processing path for the packets corresponding to the packet between the one or more processing modules of network processor 100, e.g., accelerators 108. As shown in FIG. 3, Vflow table 314 includes unlearned address counters 312 and Vflow IDs 322 associated with the received packet. A task parameter indicator (not shown) corresponding to the packet might be set to indicate that the packet corresponds to an unlearned packet that is being replicated for multicast, along with the unlearned destination hash value and the port number corresponding to the packet.

Multicast replicator 316 might provide the Vflow values to correlator 310, which determines a destination address for each multicast packet to be generated and transmitted by network processor 100. Parsing and bridging logic 306 might determine one or more destination modules of a given task. For example, parsing and bridging logic 306 might determine a 24 bit vector indicating zero or more corresponding destinations of the task and an 8-bit hash value of the corresponding packet source and destination MAC addresses. For the received multicast packet, task generator 318 might generate one or more tasks for transmission to one or more processing modules of network processor 100, e.g., accelerators 108, for further processing corresponding to each multicast packet to be transmitted by network processor 100, based on the destination addresses determined by correlator 310.

It is seen that multicast replicator 316 along with task parameter decoder 304 and Vflow table 314 including unlearned address counters 312 (the grey blocks in FIG. 3), might play a key role to perform multicast replication for a multicast packet.

If a packet received by I/O adapter 104 corresponds to a learned destination address, e.g., the hashed value of the destination address is already stored in packet learning module 308 and the corresponding counter has a non-zero value, then this indicates that multicast replicator 316 might be currently replicating tasks corresponding to the destination address. Thus, to avoid misordering of packets to the hash values of source/destination, the packet is sent to multicast replicator 316. In this case, the counter might also be incremented and the packet is sent to the replication queue. The unlearned hash decrement field might be set in the task parameter to indicate this is an unlearned task that is being replicated, with MCHash containing the unlearned hash value of the packet, and RxPort containing the physical source port of the packet. The corresponding counter might be decremented when task parameter decoder 304 receives a task indicating the packet corresponding to the hash value has been transmitted by network processor 100.

In some alternative embodiments, task generator 318 might generate a task for transmission via task ring interface 218 such that the hash operation is performed by another processing module of network processor 100, e.g., one of hardware accelerators 108, such as the MPP.

Egress task logic 320 reads the egress packet determined by task parameter decoder 304. Egress task logic 320 might allow packet data to be modified before the packet is transmitted by I/O interface 104. In some embodiments, the unlearned hash counter is associated with two global thresholds: MaxUnlearnedForwardThreshold and UnlearnedHashCounterDrainValue. When the first global threshold, MaxUnlearnedForwardThreshold, is exceeded, any unlearned packets that have a hash counter that exceeds this threshold are not forwarded by network processor 100. The second global threshold, UnlearnedHashCounterDrainValue, is checked against the per-hash counters. When the global threshold value is exceeded, no additional packets are enqueued that match the hash value, and all packets are dropped until the corresponding hash counter decrements to 0. Thus, these global thresholds allow for packet drain of multicaster 228.

Thus, as described herein, some embodiments might provide ordered multicast in several ways: (1) A counter is used to determine whether an unlearned multicast packet is being sent out. This counter is indexed by the address hash and ensures ordering, since any packet that has a hash that indexes a non-zero count is sent to the replicator even if it is a unicast task. This counter is also compared to thresholds to keep the multicast bandwidth to a minimum. (2) Any packet that needs to be sent to multiple destinations is not replicated on initial enqueue; instead, it makes a second trip through an I/O adaptor at which the I/O adaptor replicates the task header only; the non-inline task data has a multicast count which is incremented instead of replicating the data, keeping the replication overhead to a minimum, i.e., the packet data does not get copied into multiple places, reducing required bandwidth.

Figure 4:
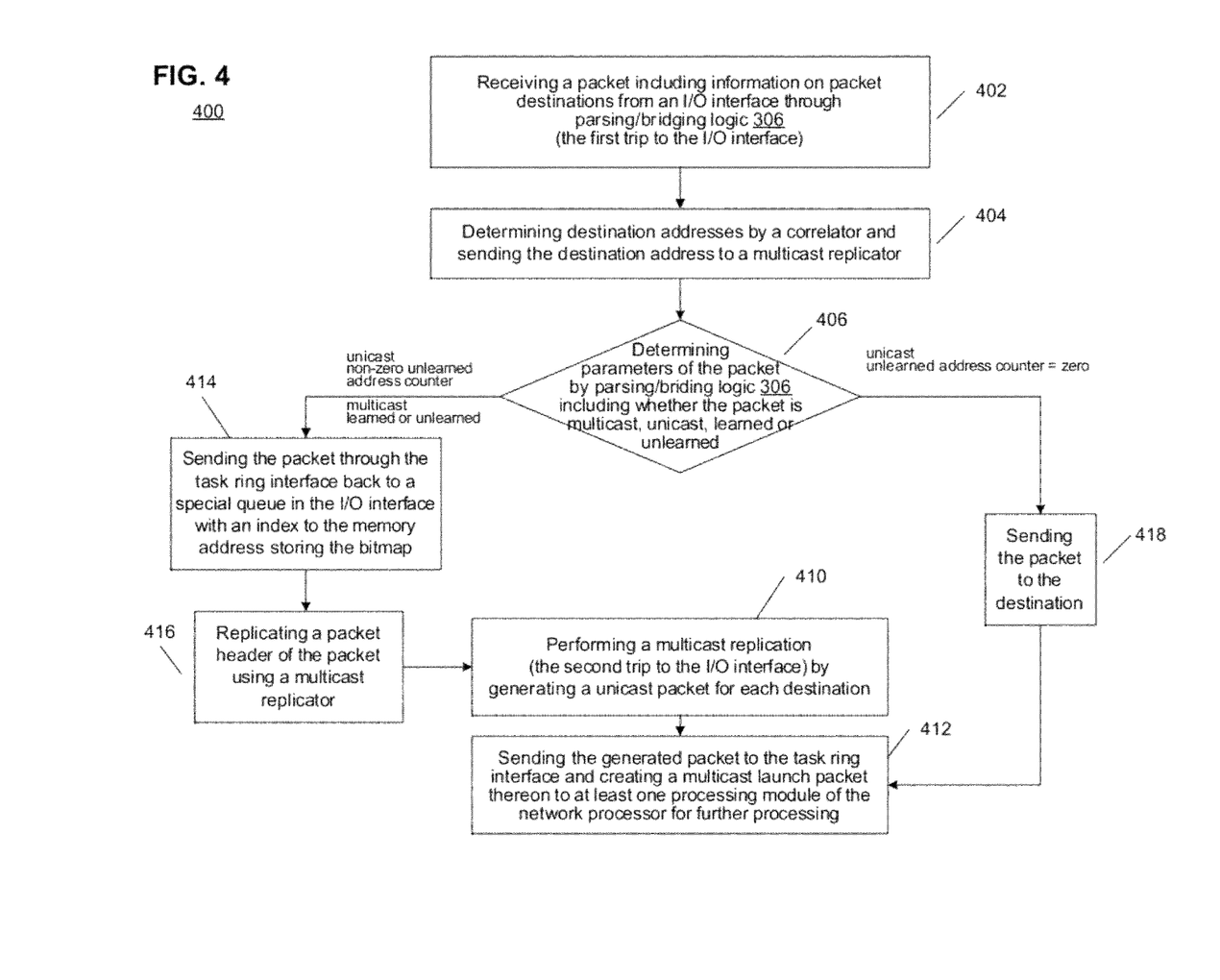
FIG. 4 is a flow chart showing an exemplary algorithm for the multicaster module in accordance with exemplary embodiments of the present invention.

FIG. 4 shows an algorithm for sending out multicast packets with multicaster 228 in I/O interface 104 in accordance with the embodiments of the present invention includes following steps.

As shown, in step 402, multicast module 228 receives a packet from I/O interface 104 through one of parsing/bridging logic 306 and task start interface 302 as shown in FIG. 3. For example, on a first task trip as described herein, packet information on packet destination might be received from parsing/bridging logic 306, and on a second task trip as described herein, packet information might be received from task start interface 302. This is the first trip that the packet passes through I/O interface 104. Details of step 402 (the first trip to the I/O interface) will be described below referring to FIG. 5. In step 404, destination addresses associated with an address hash of the packet might be determined by correlator 310. After the determination of the hash values of source/destination, the packet might be sent to multicast replicator 316. Multicast replicator 316 might then replicate the packet according to the number of the destination addresses.

In step 406, parameters of the packet might be determined that might include a virtual flow (Vflow) identification (ID) value corresponding to the packet, a source address of the packet, and one or more destination addresses of the packet, whether each task corresponds to a unicast packet or a multicast packet, whether the packet corresponds to a learned address or an unlearned address, a size of the packet, and other parameters. In the first trip to I/O interface 104 (e.g., at step 402), the task parameters might be determined by parsing/bridging logic 306, while on the second trip to I/O interface 104 (e.g., at step 408), the task parameters might be determined by task parameter decoder 304. If, at step 406, the packet is determined to be a multicast packet (either learned or unlearned) or a unicast packet having non-zero unlearned address counter, process 400 proceeds to step 414 such that the packet is replicated by multicast replicator 316 (e.g., at step 410). In order to perform a multicast replication, at step 414, the packet is sent back to I/O interface 104 over task ring interface 218 to make a second trip to I/O interface 104. The packet is sent with a multicast learned bitmap (at step 414) (or a pointer/index value to a memory address in system memory 120 corresponding to a location of the bitmap), such that a header of the packet might be replicated by multicast replicator 316 (at step 416). The first trip to I/O interface 104 might not perform the multicast replication, instead, the packet is stored in system memory 120 and task information for the packet is sent to a multicast queue. The multicast replication might be performed with the second trip to I/O interface 104. When the packet is sent through the second time, a reference count is incremented to indicate the number of times the packet is replicated, and task information pointing to the data stored in the memory is replicated and sent to one or more corresponding destination queues at steps 416 and 410. Details of step 410 (the second trip to the I/O interface) will be described below referring to FIG. 6. After the multicast replication, a unicast packet might be formed in task generator 318 at step 410 for each destination address of the multicast packet. At step 412, the generated unicast packet might be sent to task ring interface 218 where a multicast launch packet might be created and sent, over task ring interface 218, to one or more processing modules of network processor 100 for further processing.

If the packet is determined to be a unicast packet having a zero unlearned address counter, the packet might be sent to the destination directly without trips to I/O interface 104 (step 416). The packet might be sent to one or more processing modules of the network processor over task ring interface for further processing (step 412).

Figure 5:
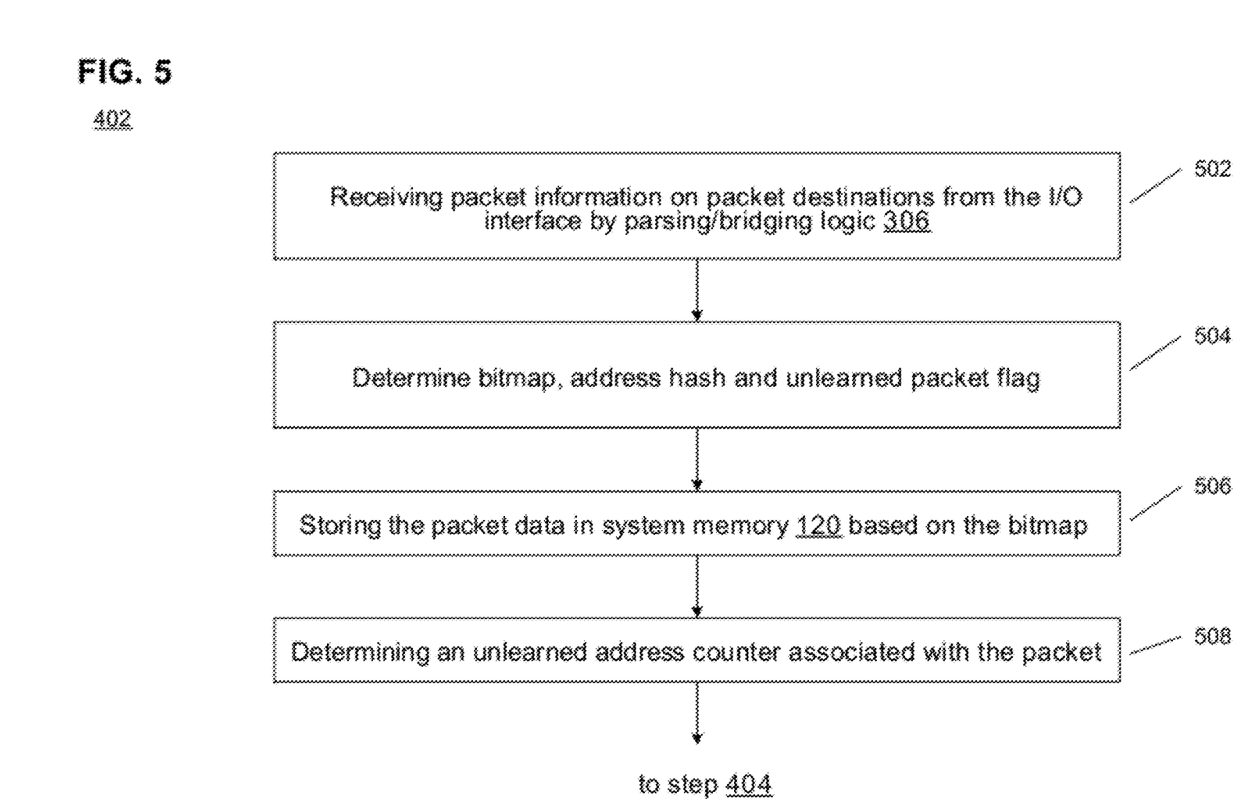
FIG. 5 is a flow chart showing an exemplary scheme for decoding task parameters shown in FIG. 4.

FIG. 5 shows the details of processing the packet at task start interface 302 and task parameter decoder 304 in accordance with described embodiments (e.g., step 402 of FIG. 4). In step 502, packet information on the packet destination(s) might be received by task start interface 302. A bitmap of the packet, an address hash of the packet and an unlearned packet flag might be determined by task start interface 302 (step 504). Then, the packet data might be stored in system memory 120 to be sent out to each location in the bitmap (step 506). Further, a plurality of unlearned address counters associated with the packet might be determined in step 508. Process 402 then proceeds to step 404 of FIG. 4.

Figure 6:
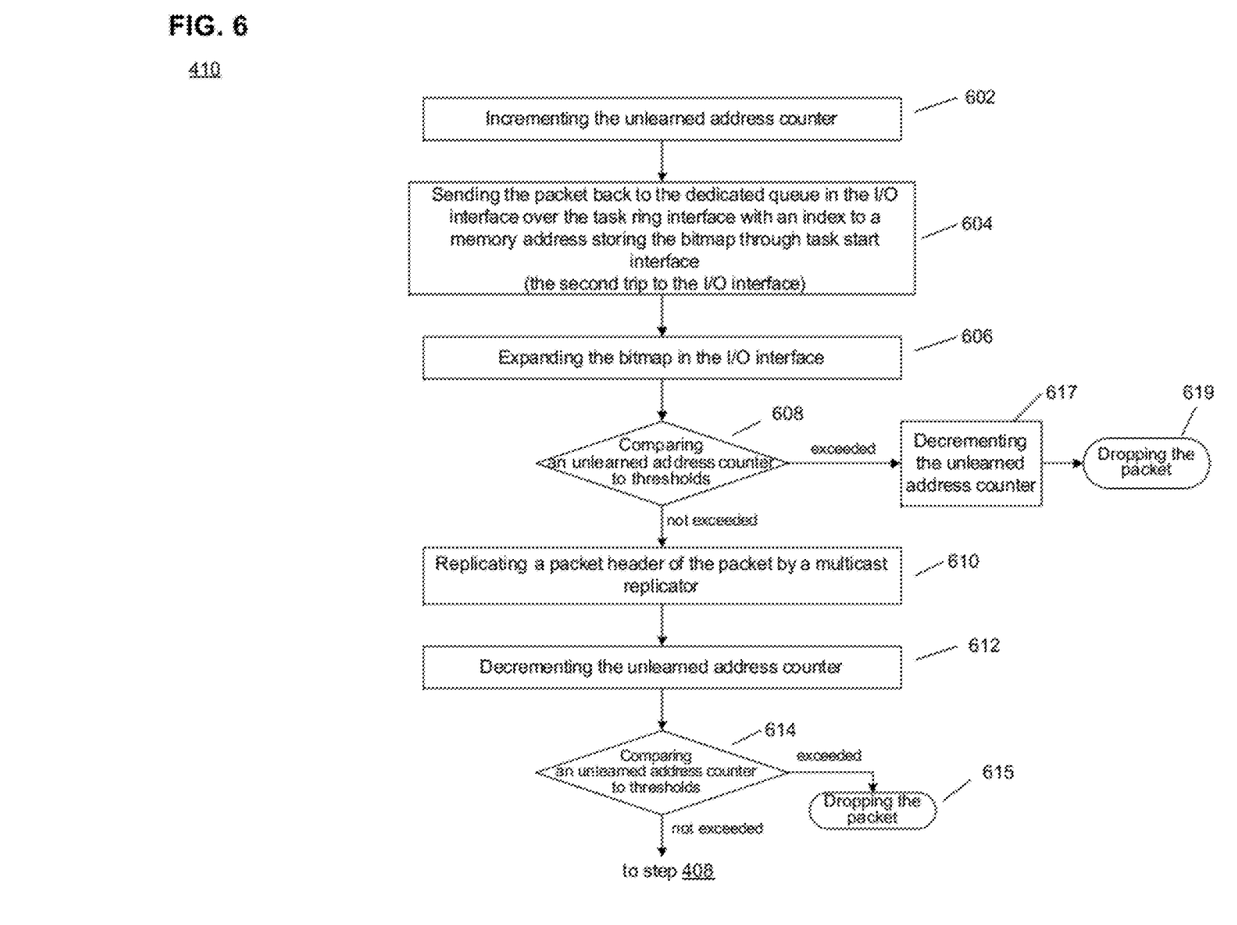
FIG. 6 is a flow chart showing an exemplary scheme for multicast replication shown in FIG. 4.

FIG. 6 shows the details of performing the multicast replication to the multicast unlearned and the unicast non-zero unlearned address counter packet in accordance with the present invention (e.g., step 410 of FIG. 4). As shown, for a multicast unlearned packet or a unicast packet having a non-zero unlearned address counter, a counter in unlearned address counters 312 associated with the packet might be incremented at step 602. In step 604, the packet is sent back to I/O interface 104 over task ring interface 218 with the bitmap (or a pointer/index value to a memory address in system memory 120 corresponding to a location of the bitmap) to make the second trip to I/O interface 104. The bitmap might then be expanded in I/O interface 104 (step 606) and the counter might be compared to drop thresholds in step 608. If the drop thresholds are exceeded, at step 617, the unlearned address counter is decremented, and the packet is dropped at step 619 to keep a bandwidth of the packet to a minimum. If the drop thresholds are not exceeded, the packet might be replicated by multicast replicator 316 (step 610). Here only a header of the packet might be replicated; packet data might not be replicated to multiple destinations, which keeps a replication overhead to a minimum. After replication, the counter might be decremented (step 612). Before sending the packet to task generator 318, another comparison of the unlearned address counter to the drop thresholds might be performed (step 614). If the drop thresholds are exceeded, at step 615 the packet is dropped to keep a bandwidth of the packet to a minimum. If the drop thresholds are not exceeded, the packet might be sent to task generator 318 (step 408).

As described herein, incrementing and decrementing the unlearned address counter might desirably ensure ordering for transmitting multicast packets. This ensures that the task in I/O adaptor 104 is properly ordered with proper multicast behavior with minimal bandwidth impact. Without this feature, a misordering of packets could occur when the packets are being learned, or more bandwidth could be required.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components might reside within a process and/or thread of execution and a component might be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein might be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. An apparatus for supporting multicast address learning for a packet to be sent to multiple destinations coupled to a network processor, the apparatus comprising:
   a task parameter decoder receiving the packet from a task ring interface of the network processor through a task start interface and determining at least one parameter of the packet including determining whether the packet corresponds to a multicast packet or a unicast packet;
   a plurality of unlearned address counters recording a number of the packets that is in a flow to be multicast and determining whether the packet is being sent out;
   a correlator determining destination addresses of the packet based on an output of a parsing and bridging logic for each packet to be generated and transmitted by the network processor;
   a multicast replicator receiving the destination addresses determined by the correlator and replicating the packet multiple times based on a number of the destination addresses corresponding to the packet; and a task generator generating a generated packet with a bitmap and sending out the generated packet to an I/O adaptor over the task ring interface, wherein the bitmap is analyzed in the I/O adaptor and multiple packets are created for transmitting to at least one processing module of the network processor for further processing based on the destination addresses determined by the correlator, wherein, if the task parameter decoder determines the packet is an unlearned packet, the unlearned address counter is incremented and the unlearned packet is sent back to a dedicated queue in the task start interface of the I/O adaptor over the task ring interface with an index to the bitmap for replicating by the multicast replicator, thereby reducing bandwidth for the replicating by replicating only header data of each multicast packet.

2. The apparatus of claim 1, wherein the unlearned packet is one of an unlearned multicast packet and an unlearned unicast packet.

3. The apparatus of claim 1, wherein, if the task parameter decoder determines that the packet is a learned multicast packet, the learned multicast packet is sent back to the dedicated queue in the task start interface of the I/O adaptor over the task ring interface with information on the bitmap, such that the I/O adaptor replicates the packet using the multicast replicator, which results in a great reduction in bandwidth since the multicast replication uses the pointers for the majority of data and only replicates the header data of the packet.

4. The apparatus of claim 1, wherein, if the task parameter decoder determines that the packet is a learned unicast packet, then the learned unicast packet is sent to the destination of the packet.

5. The apparatus of claim 1, further comprising at least one virtual flow (Vflow) corresponding to a processing path for the packet between the at least one processing module of the network processor.

6. The apparatus of claim 5, wherein the at least one Vflow is determined by the multicast replicator corresponding to the packet from a Vflow table based on Vflow identifications (IDs) associated with the packet, and the multicast replicator provides the Vflow IDs to the correlator.

7. The apparatus of claim 1, wherein the task parameter decoder provides the parameters of the packet to the multicast replicator, the parameters include a Vflow ID corresponding to the packet, a source address of the packet, at least one destination address of the packet, whether each task corresponds to the unicast packet or the multicast packet, and a size of the packet.

8. The apparatus of claim 7, wherein the task parameter decoder performs a hash operation on one or both of the source address of the packet and the destination address of the packet.

9. The apparatus of claim 8, wherein the task parameter decoder determines whether the packet corresponds to a multicast or unicast packet through checking an indicator of a bridging decision based on the destination addresses of the packet.

10. The apparatus of claim 1, further comprising a packet learning module tracking a number of the packets being processed by the network processor.

11. The apparatus of claim 10, wherein the packet learning module maintains at least one packet destination address corresponding to the packet.

12. The apparatus of claim 11, wherein the at least one packet destination address about the packet is a media access control (MAC) address, and the packet learning module tracks the MAC address of the packet received by the network processor.

13. The apparatus of claim 1, wherein the unlearned address counter calculates a hash of a source/destination address.

14. The apparatus of claim 13, wherein the unlearned address counter is indexed by an address hash and ensures ordering.

15. The apparatus of claim 14, wherein the unlearned address counter is selected by a combination of a physical input port and the address hash of the source/destination address.

16. The apparatus of claim 15, wherein the unlearned address counter is compared to thresholds to keep a multicast bandwidth to a minimum, if the unlearned address counter exceeds the threshold, the packet is dropped before sending to the task generator.

17. The apparatus of claim 1, wherein the output of the parsing and bridge logic sent to the correlator comprises a 24 bit bitmap containing the destinations of the packet, a 8 bit hash of a source/destination address, and a 1 bit flag indicating a destination address is learned or unlearned on the destination of the packet, each bit of the 24 bit bitmap responds to one destination, if multiple bits are set, the packet is multicast, if one bit is set, the packet is unicast.

18. A multicast replication logic for supporting multicast address learning for a packet to be sent to multiple destinations coupled to a network processor, the multicast replication logic comprising:

a task parameter decoder receiving the packet from a task ring interface of the network processor through a task start interface and determining at least one parameter of the packet including determining whether the packet corresponds to a multicast packet or a unicast packet;

a plurality of unlearned address counters recording a number of the packets that is in a flow to be multicast and determining whether the packet is being sent out;

a correlator determining destination addresses of the packet based on an output of a parsing and bridging logic for each packet to be generated and transmitted by the network processor;

a multicast replicator receiving the destination addresses determined by the correlator and replicating the packet multiple times based on a number of the destination addresses corresponding to the packet; and a task generator generating a generated packet with a bitmap and sending out the generated packet to an I/O adaptor over the task ring interface, wherein the bitmap is analyzed in the I/O adaptor and multiple packets are created for transmitting to at least one processing module of the network processor for further processing based on the destination addresses determined by the correlator, wherein, if the task parameter decoder determines the packet is an unlearned packet, the unlearned address counter is incremented and the unlearned packet is sent back to a dedicated queue in the task start interface of the I/O adaptor over the task ring interface with an index to the bitmap for replicating by the multicast replicator, thereby reducing bandwidth for the replicating by replicating only header data of each multicast packet.

19. The apparatus of claim 18, wherein the unlearned packet is one of an unlearned multicast packet and an unlearned unicast packet.

20. The apparatus of claim 18, wherein, if the task parameter decoder determines that the packet is a learned multicast packet, the learned multicast packet is sent back to the dedicated queue in the task start interface of the I/O adaptor over the task ring interface with information on the bitmap, such that the I/O adaptor replicates the packet using the multicast replicator, which results in a great reduction in bandwidth since the multicast replication uses the pointers for the majority of data and only replicates the header data of the packet.

21. The apparatus of claim 18, wherein, if the task parameter decoder determines that the packet is a learned unicast packet, then the learned unicast packet is sent to the destination of the packet.

22. A multicast network processor system comprising:
a task ring interface including at least one input/output (I/O) interface, at least one microprocessor and at least one hardware accelerator; and a switch coupled to the task ring interface and a shared memory, wherein the task ring interface is coupled through the switch to the shared memory,
wherein the at least one I/O interface comprises a multicast replication logic generating at least one multicast launch packet within the multicast network processor system,
the multicast replication logic comprising:
a task parameter decoder receiving the packet from a task ring interface of the network processor through a task start interface and determining at least one parameter of the packet including determining whether the packet corresponds to a multicast packet or a unicast packet;
a plurality of unlearned address counters recording a number of the packets that is in a flow to be multicast and determining whether the packet is being sent out;
a correlator determining destination addresses of the packet based on an output of a parsing and bridging logic for each packet to be generated and transmitted by the network processor;
a multicast replicator receiving the destination addresses determined by the correlator and replicating the packet multiple times based on a number of the destination addresses corresponding to the packet; and
a task generator generating a generated packet with a bitmap and sending out the generated packet to the at least one I/O interface over the task ring interface,
wherein the bitmap is analyzed in the at least one I/O interface and multiple packets are created for transmitting to at least one processing module of the network processor for further processing based on the destination addresses determined by the correlator,
wherein, if the task parameter decoder determines the packet is an unlearned packet, the unlearned address counter is incremented and the unlearned packet is sent back to a dedicated queue in the task start interface of the at least one I/O interface over the task ring interface with an index to the bitmap for replicating by the multicast replicator, thereby reducing bandwidth for the replicating by replicating only header data of each multicast packet.

23. The apparatus of claim 22, wherein the unlearned packet is one of an unlearned multicast packet and an unlearned unicast packet.

24. The apparatus of claim 22, wherein, if the task parameter decoder determines that the packet is a learned multicast packet, the learned multicast packet is sent back to the dedicated queue in the task start interface of the at least one I/O interface over the task ring interface with information on the bitmap, such that the at least one I/O interface replicates the packet using the multicast replicator, which results in a great reduction in bandwidth since the multicast replication uses the pointers for the majority of data and only replicates the header data of the packet.

25. The apparatus of claim 22, wherein, if the task parameter decoder determines that the packet is a learned unicast packet, then the learned unicast packet is sent to the destination of the packet.

26. A method for replicating unlearned multicast packets within a network processor comprising:
receiving packet information on packet destinations from an I/O adaptor of a task ring interface and determining destination addresses by a correlator and sending the destination addresses to a multicast replicator;
incrementing an unlearned address counter;
sending the unlearned multicast packet back to a dedicated queue in the I/O adaptor over the task ring interface with a bitmap;
analyzing the bitmap in the I/O adaptor;
replicating a header of the unlearned multicast packet by the multicast replicator;
decrementing the unlearned address counter after replicating;
generating a generated packet through a task generator; and
sending the generated packet back to the task ring interface with an index to the bitmap and creating a multicast launch packet thereon to at least one processing module of the network processor for further processing.

27. The method of claim 26, further comprising:
determining parameters of the packet including a virtual flow (Vflow) identification (ID) corresponding to the packet, a source address of the packet, at least one destination address of the packet.

28. The method of claim 27, further comprising:
performing a hash operation on the source address and the destination addresses by a task parameter decoder.

29. The method of claim 28, further comprising:
comparing the unlearned address counter to thresholds to keep a multicast bandwidth to a minimum, if the unlearned address counter exceeds the threshold, the packet is dropped before sending to the task generator.

30. The method of claim 26, wherein the receiving packet information on packet destinations comprises:
receiving the packet information on the packet destinations by a task start interface;
extracting the bitmap, an address hash and unlearned packet flag in the dedicated queue of the task start interface;
sending the packet out to each location in the bitmap; and
determining an unlearned address counter associated with the packet.

31. A method for replicating learned multicast packets within a network processor comprising:
receiving packet information on packet destinations from an I/O adaptor of a task ring interface and determining destination addresses by a correlator and sending the destination addresses to a multicast replicator;
sending the learned multicast packet back to a special queue in the I/O adaptor over the task ring interface with a bitmap;
analyzing the bitmap in the I/O adaptor;
replicating a header of the learned multicast packet by the multicast replicator;
generating a generated packet through a task generator; and
sending the generated packet back to the task ring interface with an index to the bitmap and creating a multicast launch packet thereon to at least one processing module of the network processor for further processing.

32. The method of claim 31, wherein the receiving packet information on packet destinations comprises:
receiving the packet information on the packet destinations by a task start interface;
extracting the bitmap, an address hash and unlearned packet flag in the special queue of the task start interface;
sending the packet out to each location in the bitmap; and
determining an unlearned address counter associated with the packet.

* * * * *